United States Patent [19]

Crowe

[11] 4,147,635
[45] Apr. 3, 1979

[54] FILTER APPARATUS

[75] Inventor: William D. Crowe, San Francisco, Calif.

[73] Assignee: J. R. Schneider Co., Inc., Tiburon, Calif.

[21] Appl. No.: 868,612

[22] Filed: Jan. 11, 1978

Related U.S. Application Data

[63] Continuation-in-part of Ser. No. 779,715, Mar. 21, 1977, abandoned.

[51] Int. Cl.² .................................................. B01D 33/14
[52] U.S. Cl. ..................................................... 210/401
[58] Field of Search .............. 210/111, 116, 127, 134, 210/135, 400, 401, 386, 297; 162/348, 351; 209/307

[56] References Cited

U.S. PATENT DOCUMENTS

| | | | |
|---|---|---|---|
| 3,083,831 | 4/1963 | Fowler | 210/111 |
| 3,091,336 | 5/1963 | Hirs | 210/111 |
| 3,121,681 | 2/1964 | Baxter | 210/400 X |
| 3,506,128 | 4/1970 | Pashaian et al. | 210/387 X |
| 3,939,077 | 2/1976 | Seibert | 210/401 |
| 4,037,338 | 7/1977 | Berline | 210/401 X |

Primary Examiner—William A. Cuchlinski, Jr.
Attorney, Agent, or Firm—Owen, Wickersham & Erickson

[57] ABSTRACT

A filter apparatus wherein filter media is submerged in liquid being filtered and suction is employed under the media to increase the flow through it. The filter media in elongated strip form is supported for movement in one direction on an inclined endless pervious conveyor comprised of rigid plate members fixed to a pair of drive chains. A receiving tank for dirty liquid is above the conveyor and media with a lower tank for clean liquid below the conveyor with the sides and ends of the lower tank being constantly sealed in order to maintain reduced pressure therein to enhance flow through the media. Filtered liquid at a somewhat higher pressure is supplied at the sides of the conveyor and at end walls of the receiving tank to prevent any migration of dirty liquid into the lower tank at the periphery of the lower tank. Advancement of the filter media is controlled automatically in response to variations in the pressure differential on opposite sides of the media which varies in proportional to the dirt load of the media.

6 Claims, 13 Drawing Figures

FIG_1

FIG_2

FIG_3

FIG_9

FIG_10

FIG_13

FILTER APPARATUS

This is a continuation-in-part of my co-pending application Ser. No. 779,715, filed on Mar. 21, 1977 which was refiled as continuation application Ser. No. 913,098, on June 6, 1978.

This invention relates to filter apparatus and more particularly to improved apparatus for filtering relatively large volumes of liquid used for or in conjunction with various industrial processes.

BACKGROUND OF THE INVENTION

Filters of the type wherein air suction is utilized to force liquid being filtered through a sheet-like filter media have been known and used in the filter art. In these prior art filters as shown, for example, in U.S. Pat. Nos. 3,087,620, 3,347,378, 3,358,834, 3,506,128 and 3,690,466, an elongated sheet of filter media, such as a thick filter paper, was supported on a chain linked conveyor located with a tank. To enhance the flow of liquid through the media some means for producing a vacuum below the media was provided. One serious problem which arose with such filters was in providing adequate air sealing along the sides and ends of the media. Without proper sealing the power required for producing an adequate suction or vacuum in the collection tank under the conveyor became excessive, or the flow produced through the filter media was inadequate due to air leakage. The sealing problem was further aggravated when it became necessary to advance the filter media as it became loaded or clogged with filtrate. The problem of maintaining an adequate vacuum in the collection tank was also related to the problem of providing a conveyor support for the media that was movable, yet perforated to the degree necessary to allow the suction force to take effect and cause liquid to flow through the media.

Other problems with such filter apparatus arose in providing an efficient means for introducing fresh filter media as the media being used became clogged and also for precoating the fresh media. In addition, it was found necessary or highly desirable to provide some means for removing excessive air from the fluid being filtered and also of removing liquid from and/or drying relatively thick filter cakes or filtrate accumulations. Further, it was desired to provide a filter apparatus that would operate at least semi-automatically without the necessity for being closely monitored.

Accordingly, a general object of the present invention is to provide an improved filter apparatus that solves the aforesaid problems.

Another more specific object of the invention is to provide a filter apparatus of the vacuum type wherein an elongated sheet or filter media forms the bottom of a receiving tank and is immersed in the liquid being filtered and is effectively sealed along both sides and the ends of the tank so that a vacuum produced in a chamber below the tank will cause a relatively high flow rate through the media.

Another object of the present invention is to provide a filter apparatus wherein an elongated filter media is supported on an inclined, continuous conveyor means that not only provides the necessary support with flexibility but also has a high porosity to facilitate adequate flow as well as strength and durability.

Another object of the present invention is to provide a filter apparatus wherein an elongated filter media is supported on a continuous conveyor that is advanced automatically at a speed that varies in response to variations in the pressure differential above and below the filter media, which variations are directly related to variations in the dirt load on the media.

Another object of the present invention is to provide a filter apparatus with an endless conveyor that is automatically controlled to advance the media under full and operating differential pressure and which permits modulation of media speed in response to variations in dirt load as signified by the differential pressure.

Another object of the present invention is to provide a filter apparatus wherein an elongated filter media forming the bottom of a receiving tank for dirty fluid is supported on a perforated continuous conveyor that is inclined upwardly from a media inlet end of the tank to a media exit end which enables the sheet media to utilize additional cake forming filter media.

Yet another object of the present invention is to provide a filter apparatus of the type wherein an elongated strip of filter media is supported on and moved by a continuous conveyor means defining a pervious wall between a receiving tank for dirty liquid and a collector tank for filtered liquid, and further to provide an adequate sealing means around the periphery of said receiving tank so that unfiltered dirty fluid cannot migrate into said collector tank.

Another object of the present invention is to provide a filter apparatus of the type wherein an elongated strip of filter media is supported on and moved by a continuous conveyor means which also provides a means for drying, dewatering and/or compressing the filter cake or the filter media at the front end of the filter.

Still another object of the present invention is to provide a filter apparatus of the type wherein an elongated strip of filter media is supported on and moved by a continuous conveyor means that is particularly easy to operate and maintain and that is particularly well adapted for ease and economy of manufacture.

SUMMARY OF THE INVENTION

A filter apparatus according to the present invention comprises generally a tank with sidewalls for receiving liquid to be filtered such as coolant for metal working machinery which must be cleansed before being recycled to the machinery. Forming an inclined bottom of this tank is one elongated portion of a continuous conveyor that is supported and sealed along its edges. In the form of the invention described and illustrated, this conveyor comprises a series of transverse, rigid plate members fixed to a pair of drive chains. At one end of the tank the drive chains extend around idler sprockets located adjacent to a system of rollers that operate to feed filter media from a supply roll into the tank. At the other end the conveyor extends around additional drive sprockets that function to move the conveyor and the filter media and to dispense the used filter media into a suitable receptacle. The transverse plate members of the conveyor are perforated and yet strong enough to support the filter media in addition to a buildup of collected solids. Below that portion of the conveyor which forms the inclined bottom portion of the receiving tank is a collection chamber for filtered liquid having an outlet connected to a suction or vacuum producing pump. The front and back transverse ends of the collection tank are provided with sealing cross members with small fluid passages and the sides of the collection tank have similar sealing members. The fluid passages of these sealing members are connected to receive clean liquid from a holding tank or reservoir at a somewhat higher pressure than that of the dirty liquid at the bottom of the receiving tank. This helps to maintain side and end sealing of the collection chamber so that the suction applied at its outlet produces an efficient vacuum within the chamber and causes increased flow of filtered liquid through the media. Precoating of the filter media is accomplished by the arrangement of cross members at the rear or deep end of the dual tank structure, and drying or dewatering of the used filter media is accomplished along an inclined end portion which extends from the upper end of the receiving tank. The filter media is advanced automatically through the receiving tank by a drive roller connected to a controller motor. Sealing around the periphery of the collection tank below the conveyor belt is constantly maintained even when the conveyor and media are moving. The speed of advancement of the conveyor and filter media is controlled by the variations in the pressure of fluid flowing from the collector chamber. Thus, the speed of filter media advancement is increased in response to media clogging which increases the vacuum in the collection chamber and retards the flow rate of clean fluid from it.

Other objects, advantages and features of the invention will become apparent from the following detailed description taken with the accompanying drawing.

DETAILED DESCRIPTION OF PREFERRED EMBODIMENT

Figure 1:
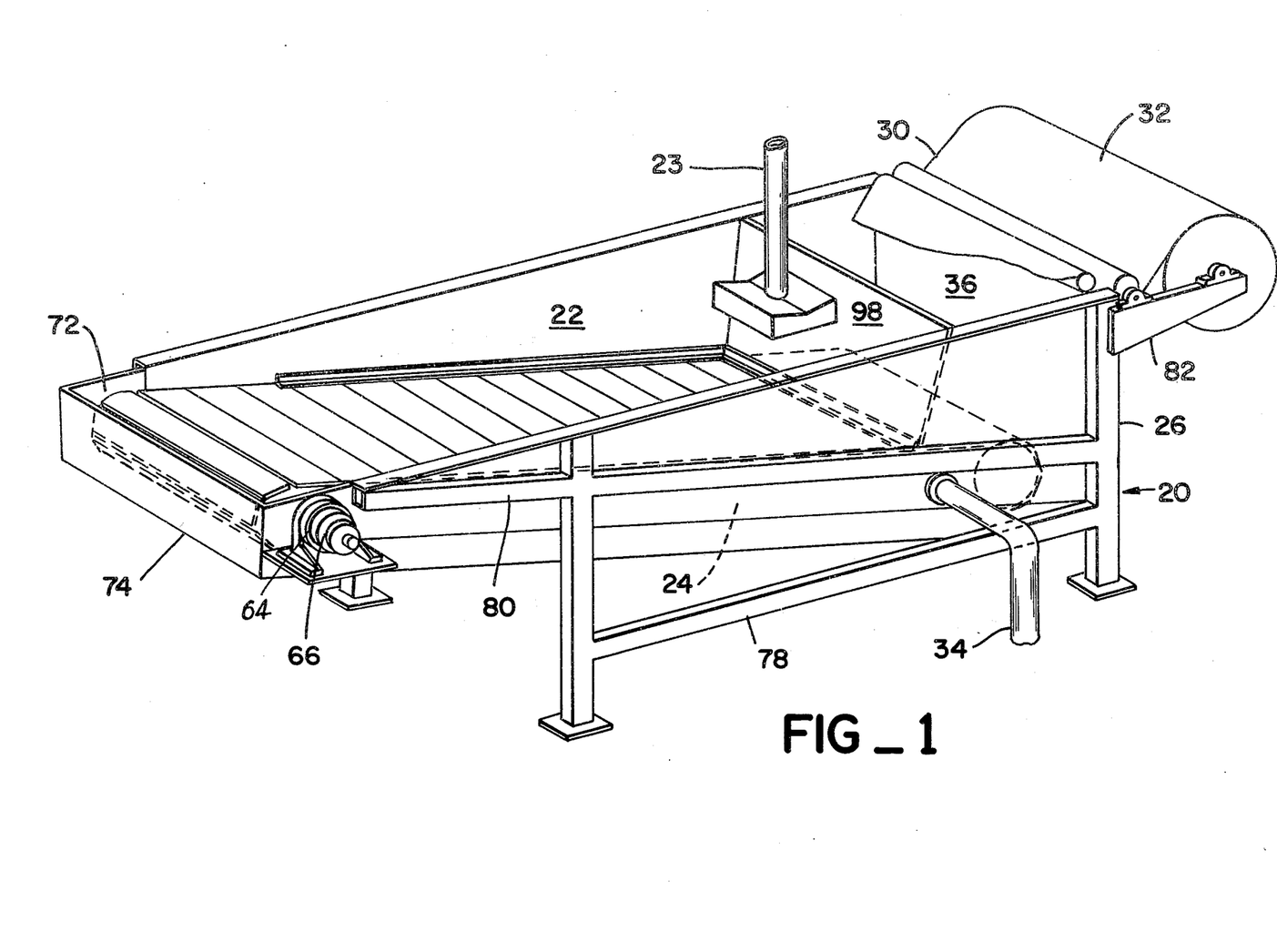
FIG. 1 is a view in perspective showing a filter apparatus embodying the principles of the present invention.

Referring to the drawing, FIG. 1 shows a filter apparatus 20 embodying the principles of the present invention. Generally, it comprises an open receiving tank 22 into which dirty liquid to be filtered is deposited through an inlet conduit 23. Located below the receiving tank is a collection tank 24 for clean, filtered liquid, both tanks being supported by a suitable frame 26. Separating these two tanks and forming the bottom of the receiving tank is an inclined perforated conveyor belt 28 which supports a layer or strip of filter media 30 fed from a supply roll 32 mounted on the frame. The collection tank under the belt has an outlet conduit 34 connected to a suction pump (not shown in FIG. 1), and its periphery is sealed from the receiving tank. This enables reduced pressure to be maintained in the collection tank which induces greater flow through the filter media and the supporting pervious belt. The aforesaid sealing is accomplished in part by clean liquid supplied from a rear storage reservoir 36 to fluid passages around the periphery of the collection tank at a fluid pressure which is greater than that within the receiving tank. The entire sealing arrangement for the collection tank relative to the movable conveyor belt and the receiving tank will be described in detail later on.

In the present embodiment the conveyor belt is continuous and is comprised of a series of parallel grid plates 38 extending transversely between and attached to a pair of endless chains 40.

As shown in detail in FIGS. 5–8, each grid plate 38 has a constant width and is made from an elongated piece of fairly rigid material, such as aluminum. The upper or outer surface of each plate is provided with alternating ridges 42 and grooves 44 of uniform depth (e.g 0.5–0.12 inches) and width (e.g. 0.20–0.25 inches) that extend its full length. Provided within these grooves at spaced apart intervals are groups of punched or drilled holes 46 through which filtered fluid can flow. Along the opposite ends of each grid plate the grooves are filled in within a suitable material such as a relatively hard plastic so as to be flush with the adjacent ridges, thereby providing a smooth strip 48 along both opposite sides of the conveyor belt. The underside of each grid plate near its end is secured by suitable fasteners 50 to T-shaped connectors 52 attached at spaced apart intervals to adjacent chain links (See FIG. 8). Thus, each grid plate is spaced somewhat above but is pivotal with respect to both of the attached chains 40. Both chains extend around pairs of supporting sprockets mounted at opposite ends of the frame. At one end of the apparatus the chains engage a pair of lower sprockets 54, fixed to a shaft 56 supported by bearing members 58. From these lower sprockets the belt slopes upwardly, and at the front end of the apparatus the chains 40 extend partially around a pair of upper or front sprockets 60 fixed to a shaft 62 and connected through a suitable mechanical gearing mechanism, designated by numeral 64 to a drive motor 66. The shaft 62 for the upper sprockets 60 is supported in a pair of bearings 68 fixed to supports 70 attached, as by welding, to the end of the frame. Surrounding the drive motor and upper sprockets is a forward reservoir 72 of clean liquid formed by a partial enclosure 74 comprising a series of wall members attached to the frame. When moving in a planar path the grid plates are edge to edge and form a generally flat, rigid surface, but when the chains reach a pair of end sprockets the grid plates are caused to pivot on the chains and the edges of adjacent plates temporarily move apart as they move around the sprockets. At the forward end of the apparatus is a drying chamber 149 for removing excess moisture from the filter media before it moves over the front sprockets and into a suitable receptacle 76. The apparatus is provided with a control system (not shown in FIG. 1, but described in detail later on with reference to FIG. 13) which automatically controls the motor 66 so as to modulate the advancement of the conveyor belt and filter media in response to variations in the differential pressure in the receiving tank and collection tank.

Figure 2:
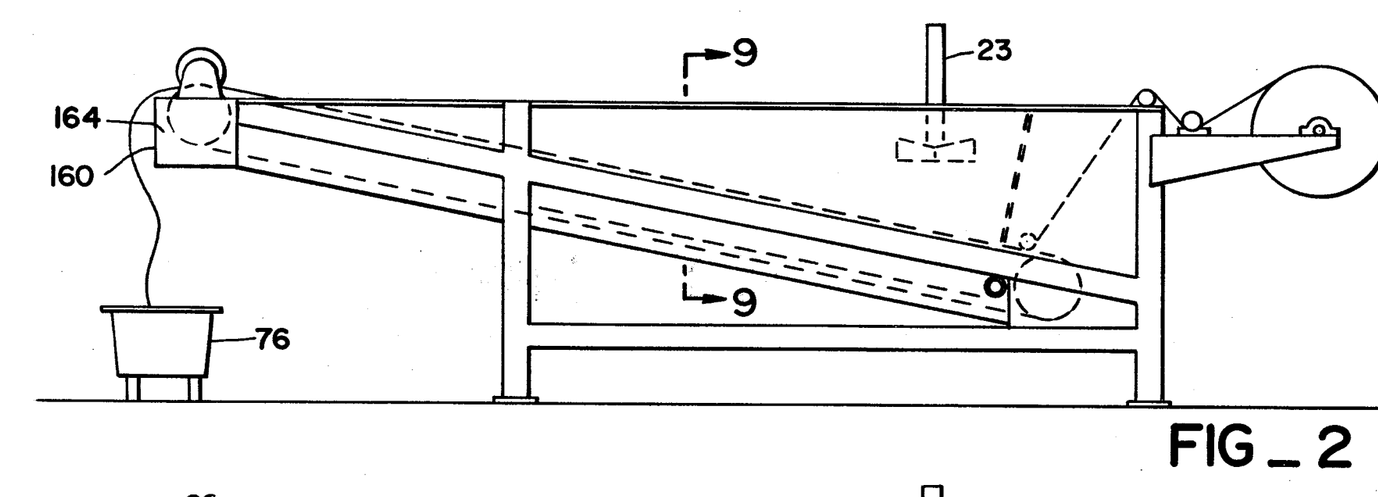
FIG. 2 is a view in side elevation of the filter apparatus of FIG. 1.
Figure 3:
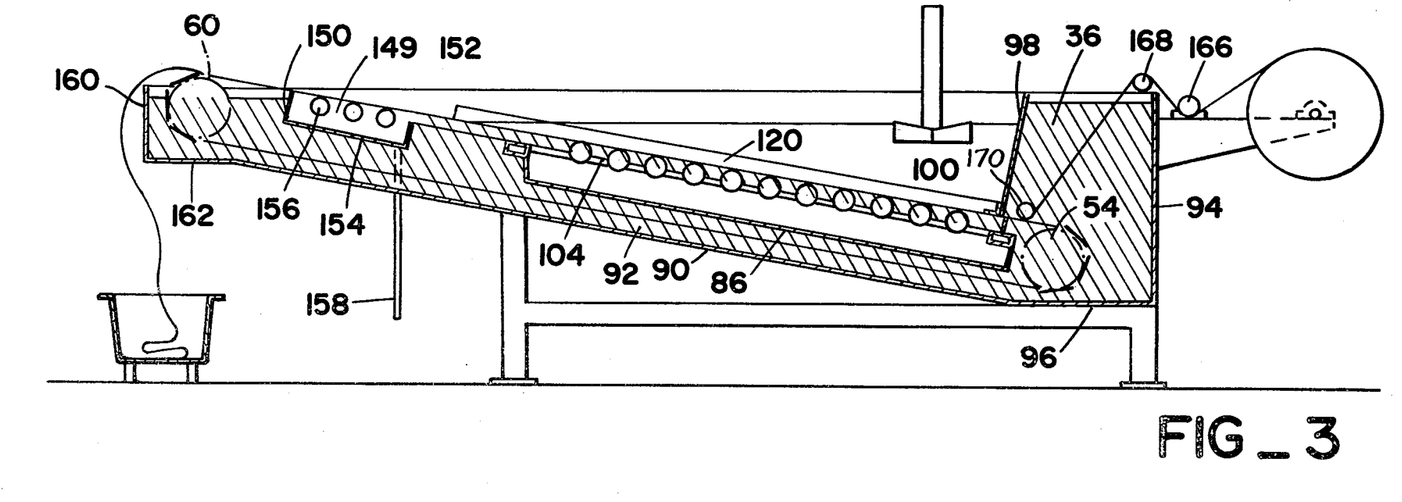
FIG. 3 is a view in side elevation and partially in section of the filter apparatus of FIG. 1 with a cross hatched area indicating the location of clean sealing liquid during its operation.
Figure 4:
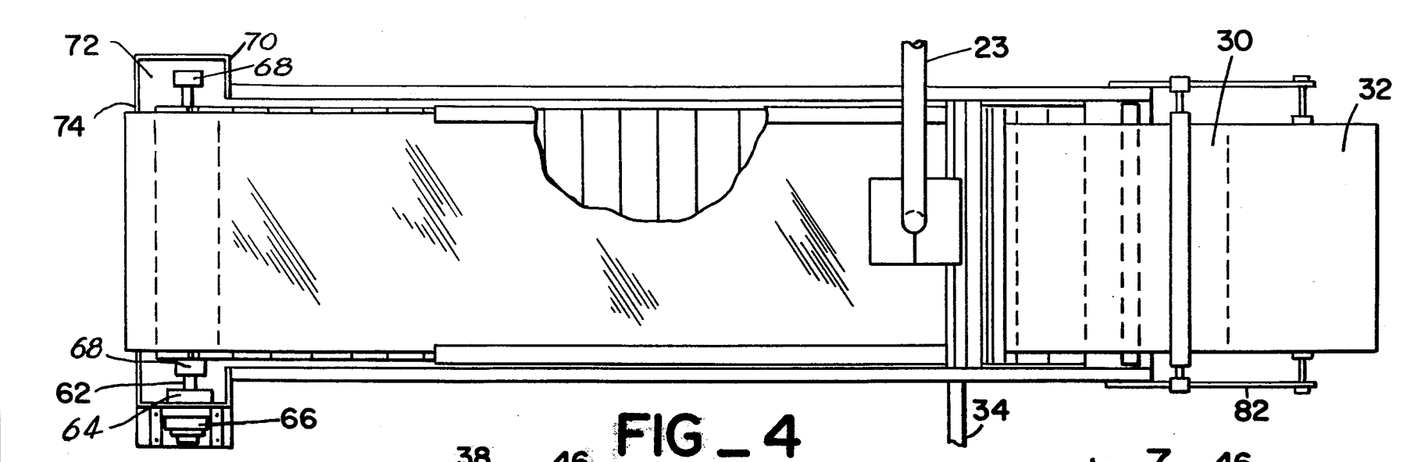
FIG. 4 is a top view of the filter apparatus with portions broken away.
Figures 5, 6, 7, 8:
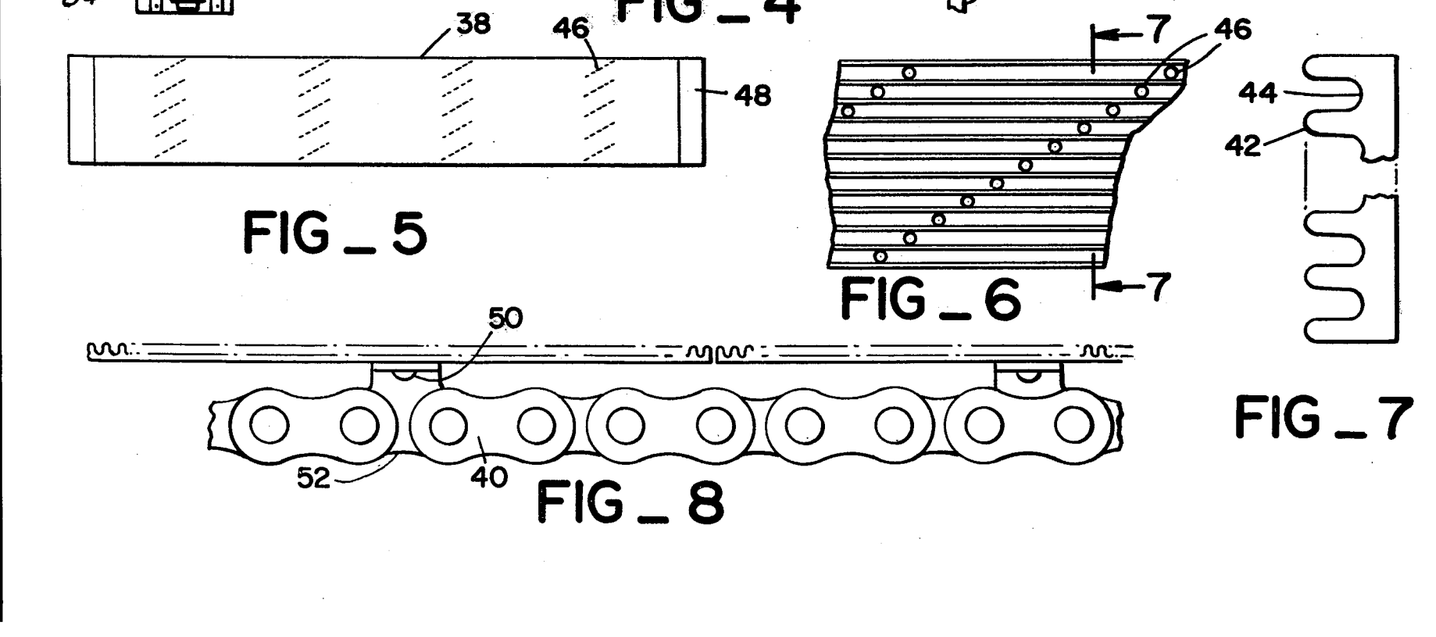
FIG. 5 is a top view of one grid plate of the conveyor belt for a filter apparatus according to the invention.
FIG. 6 is an enlarged fragmentary view of one grid plate of the conveyor belt.
FIG. 7 is an enlarged fragmentary view in section of the conveyor belt grid plate of FIG. 6, taken along line 7—7 thereof.
FIG. 8 is a fragmentary side elevation view of the conveyor belt.

Turning now to FIGS. 2-4, the apparatus 20 will be described in greater detail. The frame 26 is comprised of a pair of spaced apart rear upright members and similar forward upright members, all of which may be formed from rigid structural metal material such as elongated channel shaped stock. Interconnecting and extending between these front and rear upright members are a pair of lower horizontal members 78. Above them are a pair of inclined members 80 that are fixed to the upright members and extend forwardly from the front upright members.

The filter media supply roll 32 is supported by bearings fixed to a pair of arms 82 that are cantilevered rearwardly from the frame members.

Fixed to the inside surfaces of the supporting frame members are a pair of appropriately shaped sheet metal members forming the side walls 84 of the receiving tank and the collection tank (FIG. 3). A sheet metal bottom 86 for the collection tank extends between the bottom edges of the side walls. Extending below the side walls 84 and coincident therewith are downwardly extended side walls 88 and a false bottom 90 forming a lower chamber 92 for clean sealing fluid which is connected with the rear storage reservoir 36 for such fluid. The latter reservoir is formed by a rear wall 94 which is fixed to the rear vertical edges of rearwardly extended side wall portions, a bottom 96 connected to the false bottom 90 and a wall member 98 extending between the side walls which separates the rear reservoir of clean sealing liquid from the receiving tank.

At the forward end of the apparatus the lower chamber 92 extends under the drying chamber 149 and connects with the forward reservoir 72 formed by the enclosure 74 around the upper sprockets 60. Thus, clean sealing fluid constantly fills the rear reservoir 36, the lower chamber 92 under the collection tank and up into the forward reservoir 72. The arrangement effectively eliminates the need to provide an air seal at the front sprockets 60 for the returning conveyor belt 28 when it re-enters the rear reservoir.

Figures 11, 12:
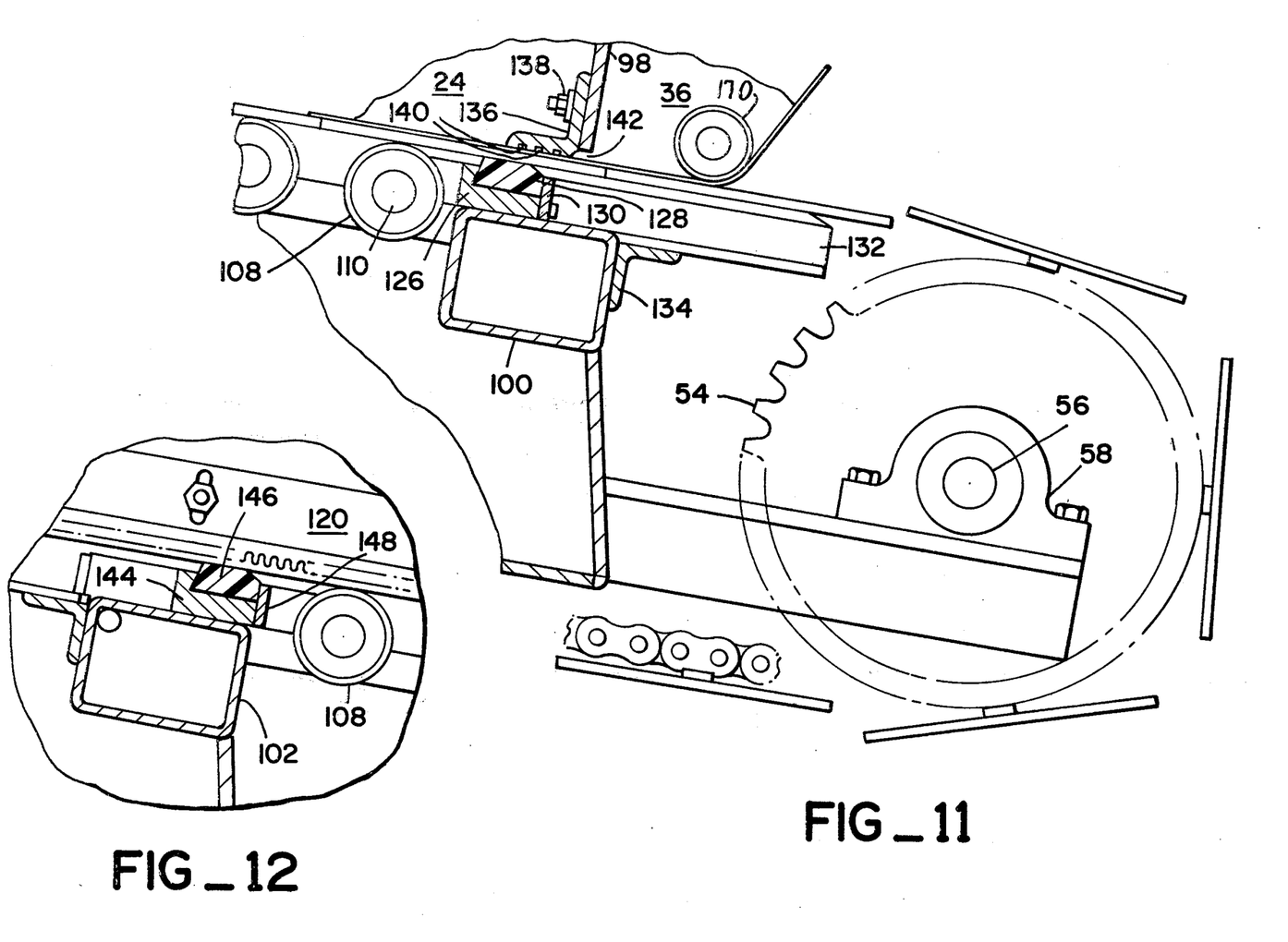
FIG. 11 is an enlarged fragmentary view in section showing details of the rear cross seal member.
FIG. 12 is an enlarged fragmentary view in section showing details of the forward cross seal member.

Extending between the side walls 84 at their rear ends and between the receiving tank and the collection tank is a transverse rear support member 100 (FIG. 11). A similar transverse front support member 102 is fixed to the side walls at their forward ends (FIG. 12). In the embodiment shown, both of these support members are hollow but rigid structural members with a rectangular cross-section that provides an upper flat surface essentially parallel with the slope of the inclined frame members 80.

Figure 9:
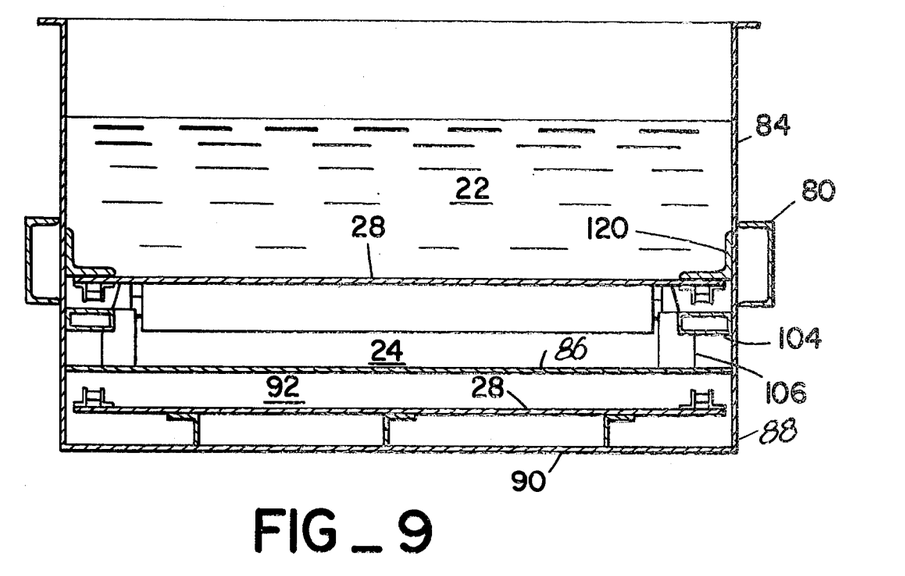
FIG. 9 is an enlarged view in section taken at line 9—9 of FIG. 2.
Figure 10:
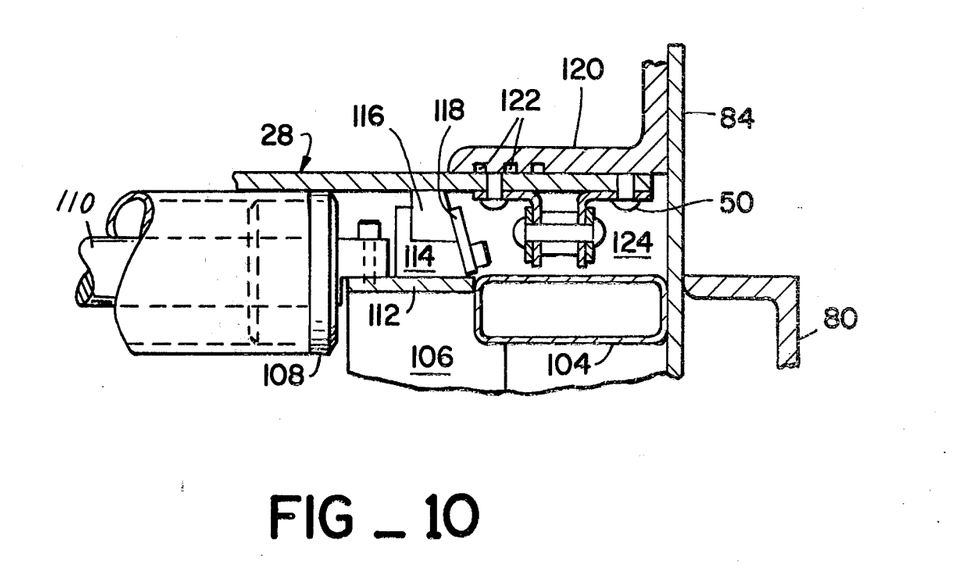
FIG. 10 is an enlarged fragmentary view in section showing details of the side sealing members on one side of the conveyor belt.

Attached to the inside surface of each side wall 84 is a rigid inclined member 104 forming a side support. As shown in FIGS. 9 and 10, these support members may have a rectangular, tubular cross section with a flat upper surface. Spaced apart at intervals below each support member are a series of vertical strengthening members 106, comprised of short metal pieces that are also fixed to a lower portion of each side wall 84 and to the bottom 86 of the collection tank 24.

Support for the entire span of that portion of the inclined belt 30 which forms the bottom of the receiving tank 22 is afforded by a series of idler rollers 108 located under the belt and mounted on spaced apart shafts 110 extending perpendicular to its direction of travel. The ends of these shafts are supported on an elongated bearing plate 112 fixed to the upper ends of the vertical members 106 that help to support the inclined side support members 104. Also mounted on each bearing plate is an angle shaped holder 114 for an elongated side runner 116 made of a suitable low friction plastic material such as ultra high molecular weight polyethylene. This plastic runner is maintained within the holder by a side retainer strip 118 and spaced apart fasteners through it.

The outlet 34 of the collection tank 24 is connected to a suction pump which creates and maintains a reduced pressure within the collection tank to enhance flow of liquid through the filter media and the supporting inclined pervious belt 28. In order to maintain the reduced pressure within the collection tank, adequate sealing along its side and edges must be provided. This is accomplished in part by provision of a pair of right angle side sealing members 120. As shown in FIG. 10, the vertical leg of each of these seal members is secured by suitable fasteners to the inside surface of a side wall member 84, and its horizontal leg is spaced just above and extends parallel to the flat surface of a belt side portion 48. A series of grooves 122 provided in the lower surface of the horizontal leg form a labyrinth on each side sealing member. On each side of the filter 20, the sidewall 84, the inclined member 104, the runner 116 and its retaining strip 118 and the sealing member 120 form a channel-like side chamber 124 which is supplied with clean liquid from the rear reservoir 36. The side edge portion of the belt is movable between the runner 116 and the grooved sealing member 120 and since the clean liquid pressure in the side chamber is greater than the dirty liquid pressure above the belt, the clean liquid fills the labyrinth grooves 122 and prevents any migration of dirty liquid around the edge of the belt.

Attached to the upper surface of the rear support member 100 is a holder 126 for an elongated transverse plastic sealing strip 128 which is held in place by a retainer 130. The top surface of this sealing strip contacts the underside of the belt grid plates 38 as they move under the receiving wall 98. The rear edge of the sealing strip is beveled so there will be no tendency for it to "hang up" on an edge of one of the grid plates. Just rearward from the sealing strip holder are a plurality of spaced apart guides 132 that are perpendicular to the sealing strip and have upper surfaces flush with its top surface. The lower ends of these guides which are supported by an angle 134 fixed to the cross member 100, are tapered so that they will properly engage each grid plate even if it tends to sag or bend as it approaches the rear sealing strip.

As shown in FIG. 11, sealing of the receiving tank 22 along the bottom edge of the rear wall 98 is accomplished by a right angle sealing member 136 that is similar in structure and function to the side sealing members 120. Here, the upright leg portion of the sealing member is fixed to the lower edge of the rear wall, as by machine bolts 138, so that its horizontal leg portion provided with bottom surface grooves 140 is spaced just above the rear transverse seal member 128 and so as to be almost in contact with the filter media 30 which passes under it.

The lower edge of the rear wall 98 is spaced above the belt surface by a small distance (e.g. 0.15 inches) so that it forms a transverse gap 142 into which clean liquid can flow from the reservoir 36. With the pressure of the clean liquid again being slightly greater than that of the dirty liquid on the other side of the rear wall any migration of dirty fluid from the receiving tank into the reservoir 36 is prevented.

Fixed to the upper surface of the front support member 102 as shown in FIG. 12 is another elongated holder 144 for a front transverse sealing strip 146 which is held in place by a retainer strip 148. This sealing strip also has a beveled rear edge and a smooth upper surface that contacts the underside of the grid plates as they move by.

The length of the rear sealing strip 128 and its holder 126 is less than the distance between side wall members 84. Thus, at both opposite ends thereof are openings from the clean liquid storage reservoir into the elongated passages or chambers 124 along the side wall sealing members just above the inclined belt support members. As previously described, the clean liquid within these chambers 124 under the edges of the moving belt 28, is at a slightly greater pressure than dirty liquid on the upper side of the belt and as seen in FIG. 9, therefore, prevents any dirty liquid from the receiving tank from migrating between the sealing members 120 and the upper surface of the belt edges 48.

Near the forward, upslope end of the apparatus and spaced forwardly from the collection tank, a drying compartment 149 may be provided for further extracting liquid from the accumulated filtrate on the media. Details of such a dewatering or drying compartment are provided in my co-pending application Ser. No. 779,715. In general, it comprises a compartment formed by front and rear walls 150 and 152 that extend between and are fixed to a bottom 154 and the main side walls 84. A series of rollers 156 are provided to support the belt 28 and the media thereon and a suitable compression means (not shown) may be used to apply a compression force on the media to extract liquid as it passes over the compartment. Drainage of the compartment is accomplished through an outlet 158 connected to a suction pump (not shown).

As noted previously, the forward drive sprockets 60 and their shaft 62 are surrounded by a sheet metal enclosure 74 which is connected with the reservoir 36 of clean liquid for sealing through the bottom chamber 92 of the apparatus. Thus, as shown in FIG. 3, the enclosure 70 includes a front wall 160 and a bottom wall 162 with end walls 164 connected to the main sidewalls 84. Clean liquid can thus flow freely from the clean liquid reservoir 36 and the liquid level in the forward enclosure 74 is the same as that in the reservoir. With this arrangement the bottom returning portion of the belt is constantly surrounded by liquid and there is no problem of sealing the returning belt. In FIG. 3, the clean sealing liquid in the reservoir 36, the side chambers 124, the lower chamber 92 and the forward reservoir 72 is designated by cross hatching.

Figure 13:
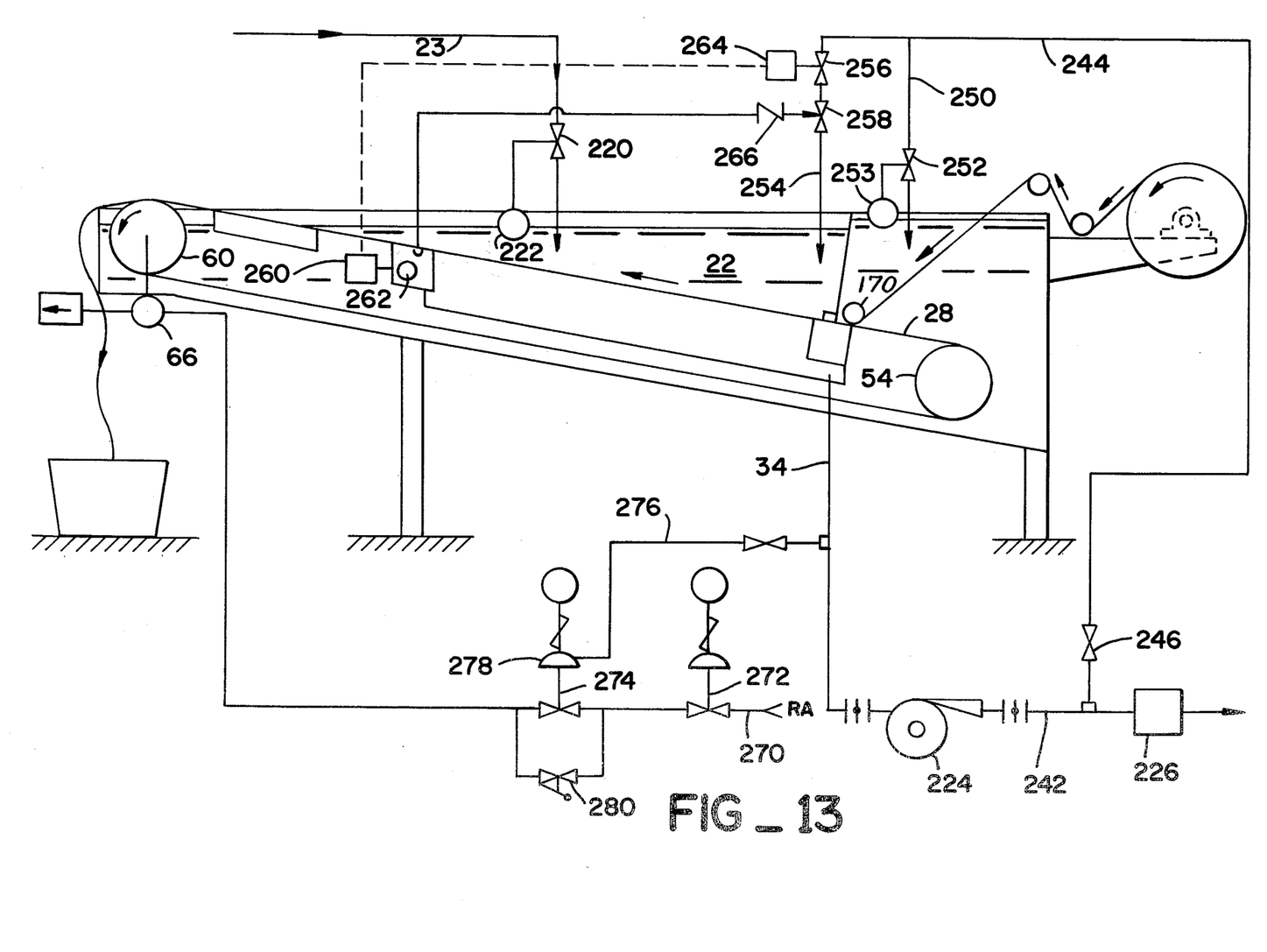
FIG. 13 is a schematic diagram of a filter apparatus according to the present invention showing its principle operating components.

The control system for the filter 20 and its operation in a typical industrial installation may be best understood by reference to the schematic diagram of FIG. 13. Filter media 30 from the fresh roll supply 32 is first threaded under a tension roller 166 on the outside of the apparatus, then over a higher roller 168 and down into the clean liquid reservoir 36. Within this reservoir it extends around a rear belt roller 170 and then under the rear wall 98 and its attached seal member 136 and into the main receiving tank 22. As the filter media leaves the receiving tank it passes over air stripping chamber 188 and partially around the forward loop of the belt formed by the sprockets driven by the motor. Shortly after starting around this forward loop, the media separates from the belt and is directed downwardly into the receptacle 76. Direct manual override operation of the air motor is used to move the belt to facilitate initial threading.

Dirty fluid collected from a typical process apparatus is furnished through a fluid inlet line 23, an inlet level control valve 220 and into the receiving tank 22. A float 222 within the receiving tank is connected to the valve 220 so that it will shut off automatically when the tank is full.

The outlet from the clean fluid collection tank under the belt is connected through the fluid outlet conduit 34 to the inlet of a main vacuum pump 224. Initial filling of the receiving tank is accomplished with the vacuum pump off. An outlet conduit from this pump is connected through a flow control valve 226 that maintains constant flow to a suitable storage tank (not shown) for clear filtrate.

A return or feed back line 244 for clean fluid is connected to the outlet line 242 from the pump 224 and passes through a manual valve 246. A first branch line 250 from the return line 244 passes through a valve 252 and furnishes clean fluid to the reservoir 36. This valve is controlled by a float 253 located in the reservoir. A second branch line 254 from the fluid line 244 is connected through a solenoid controlled level valve 256 to an eductor valve 258 whose outlet is furnished to the receiving tank or to the reservoir. A level switch 260 for the valve 256 is connected to a float 262 provided in an air stripping chamber 188 at the front end of the filter. When excessive stripped air is present in the stripping chamber, the float 262 will actuate the level switch 260 which in turn operates another switch 264 on a level valve pilot controlling the eductor. The eductor then operates to suck air from the front stripping chamber 188 through a check valve 266 and expels it through an exhaust port of the eductor. When the level switch closes, the eductor continues to allow clean fluid to flow automatically into the receiving tank.

Another tap of regulated compressed air (RA) is supplied to an air line 270 through a first pressure regulator valve 272, a speed regulator valve 274 and thence to the air motor 66 for advancing the conveyor belt 28. As previously described, the air motor is connected through a suitable drive system to the front end sprocket shaft of the apparatus. The pressure regulator valve 272 operates to maintain the air pressure at a uniform desired operating level. The speed control valve 274 is controlled by fluid pressure in a line tap 276 from the fluid outlet conduit 34 which is connected to a diaphragm 278 for the speed control valve. When the outlet line pressure decreases to a preselected level due to clogging of the filter media on the belt and consequently causing a reduction of pressure in the collection chamber 24, the diaphragm 278 operates to open valve 274 and thereby furnish regulated air to the air motor so that the dirty filter media will be advanced by the belt. A manually controllable bypass valve 280 is provided around the automatic speed control valve in order to operate the air motor when it is desired to advance the media, as when installing or threading it through the apparatus.

From the foregoing description, it should be apparent that the present invention provides a movable belt type filter apparatus with improved efficiency and versatility. Using the reservoir 36 of clean liquid connected to the sealing members 120 along the side chambers 92 and the rear wall 98 of the receiving tank 22 solves the problem of peripherally sealing the lower chamber or collection tank for clean liquid below the moving belt 28. Providing a belt formed of rigid but thin plates fixed to a pair of drive chains and arranging the belt at an inclined position provides a strong, movable media support with several advantages such as facilitating the use of a variety of cake type or paper media. The belt itself, though pervious and flexible, is exceptionally durable and is movable with a minimum of function which allows a relatively high vacuum to be used. The control system for the apparatus provides a reliable means for modulating the advancement of the belt and filter media in response to an increase in the pressure differential between the dirty and clean tanks which is also a measure of the buildup of accumulated solids on the media. The apparatus may be useful in a wide range of industrial applications and will operate continuously without manual control or monitoring.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A filter apparatus comprising:
   a frame;
   a continuous flexible and pervious conveyor belt comprised of relatively thin transverse plates fixed to a pair of continuous chains;
   upper and lower spaced apart sprocket means on said frame for supporting said chains so that an inclined upper portion of said belt slopes upwardly;
   side wall and end wall means forming a receiving tank for dirty liquid above said inclined upper portion of said belt and a collection tank for clean liquid below said inclined upper portion and under said receiving tank;
   inclined belt support means fixed to said sidewall means;
   means for feeding a layer of filter media onto said belt so that it can cover the upper surface of its said inclined upper portion;
   sealing means around the periphery of said collection tank comprising elongated sealing members fixed to each said receiving tank side wall and spaced above said inclined belt support means to form side chambers for clean liquid and means for supplying clean liquid to said side chambers and to the lower end of said receiving tank at a pressure greater than the pressure of dirty liquid within said receiving tank, thereby preventing the migration of dirty liquid around the side edges of said belt into said collection tank;
   suction means for reducing the pressure within and withdrawing clean liquid from said collection tank; and
   drive means connected to said upper sprocket means for moving said conveyor belt and thus the media thereon forwardly and upwardly along said incline.

2. The filter apparatus as described in claim 1 wherein said means for supplying clean liquid comprises a reservoir for constantly maintaining clean liquid at a level higher than the level of dirty liquid in said receiving tank.

3. The filter apparatus as described in claim 1 wherein said means for supplying clean liquid comprises a rear reservoir surrounding said lower sprocket means and connected to said side chambers, a front reservoir surrounding said upper sprocket means, means for interconnecting said front and rear reservoirs, and means connected to the outlet of said suction means for supplying clean liquid to said reservoirs.

4. The filter apparatus as described in claim 3 wherein said means for interconnecting said front and rear reservoir comprises a chamber under said collection tank formed by a false bottom member connected between said side walls.

5. The filter apparatus as described in claim 1 wherein each said plate is formed from a sheet of metal and has a series of longitudinally extending alternating ridges and grooves in its upper surface with spaced apart holes in said grooves, and means for pivotally connecting the underside of each said plate to said chains near the opposite ends of each plate.

6. The filter apparatus as described in claim 1 including supporting strip means for engaging and supporting the underside of the up sloped portion of said conveyor belt along its opposite sides and a similar transverse strip means for engaging the underside of said conveyor belt at the lower end of said receiving tank.

* * * * *